Nov. 10, 1959     N. J. BOWNIK, JR     2,912,602
MAGNETIC PULSE GENERATOR
Filed Oct. 16, 1958
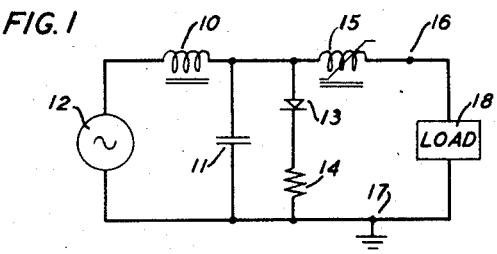
FIG. 1
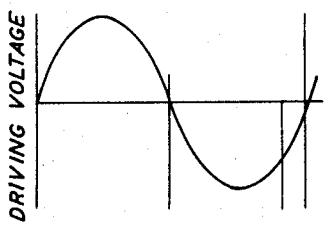
FIG. 2A
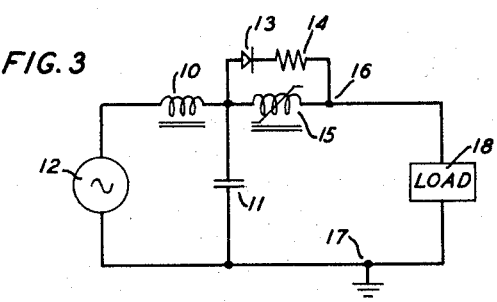
FIG. 3
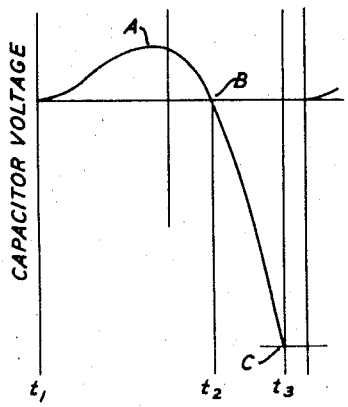
FIG. 2B
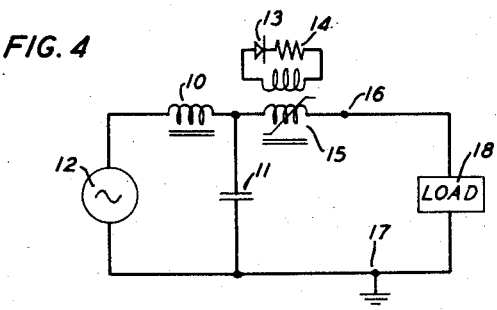
FIG. 4
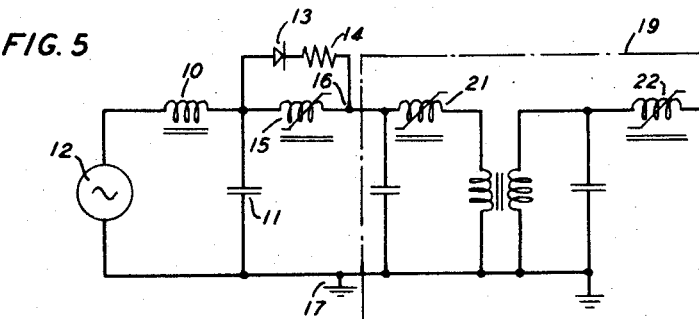
FIG. 5
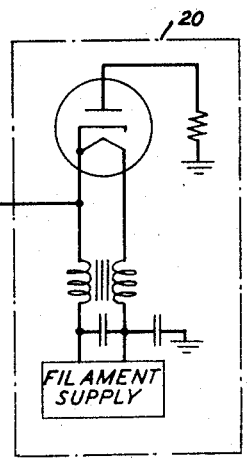
INVENTOR
N. J. BOWNIK, JR.
BY Walter M. Hill
ATTORNEY

United States Patent Office 2,912,602
Patented Nov. 10, 1959

2,912,602

MAGNETIC PULSE GENERATOR

Nicholas J. Bownik, Jr., Maplewood, N.J., assignor to Bell Telephone Laboratories, Incorporated, New York, N.Y., a corporation of New York Application October 16, 1958, Serial No. 767,722

13 Claims. (Cl. 307—106)

This invention relates to improvements in electrical pulse generators and, in particular, to improvements in pulse generators of the magnetic type.

With the advancement of the electronic art it has been found necessary to provide pulses at the termination of closely controlled timing intervals. One type of pulse generator that has been conceived in solving this problem is the so-called magnetic pulse generator. Several variations of these generators are disclosed in the "Proceedings of the Institution of Electrical Engineers," volume 98, part III, 1951, pages 185–207; in U.S. Patent No. 2,727,159, issued on December 13, 1955, to J. E. Sunderlin; and in application Serial No. 475,029 filed on December 14, 1954, by C. Neitzert. In general these generators include a charging circuit comprising an inductor and a capacitor with a saturable core reactor for discharging energy from the capacitor into either a load or a pulse-forming network which in turn discharges the energy into a load. In order to discharge energy of only one polarity into the load, the saturable reactors are polarized by applying constant potentials to auxiliary windings on the reactors. Sources of sinusoidal voltages may be used for driving these circuits, although other sources producing positive and negative voltages in a cyclic manner may be used as disclosed in the above references.

It has been found that the timing intervals produced by a polarized magnetic pulse generator may vary as a result of slight variations in either the driving energy applied to it or the energy unabsorbed by its load. (Changes in either the amplitude or waveform of the driving voltage may affect the driving energy, while load changes may affect the amount of energy unabsorbed by the load.) These timing interval variations are attributed to the fact that either input or output energy variations produce shifts in reference voltage levels at various points in the circuit which cannot compensate for one another becaus of the fixed polarizing potential introduced in only one portion of the circuit.

The above-described timing interval variations have been reduced to a limited extent by using relatively high Q inductors in the charging circuits. With a high Q charging inductor, the potential applied to the saturable reactor changes more rapidly with respect to time. This increases the rate at which energy is applied to the reactor. Because energy is applied to the reactor at an increased rate, the changes in time necessary to saturate the reactor for the above-described energy variations are reduced, thereby reducing variations in the timing interval. It has been found, however, that even with high Q inductors, these timing interval variations still exist to the extent of being objectionable under some operating conditions. In addition, high Q inductors are more expensive, heavier and more voluminous than lower Q inductors. It would therefore be advantageous to further reduce these timing interval variations without having to resort to high Q components.

Furthermore, it has been found that the reactor biasing or polarizing supplies should have output impedances which do not materially affect the operation of the circuits by providing continuous low impedance shunts across the reactors. This requirement necessitates the use of inductors having large values of inductance in the biasing supplies. These high valued inductors increase the weight, volume and power consumption of the circuits by considerable amounts.

An object of the present invention is to reduce variations occurring in the timing intervals produced by a magnetic pulse generator when variations occur in either its input or output energies.

Another object is to reduce the weight, volume and power requirements of magnetic pulse generators by eliminating the saturable reactor biasing supplies.

These and other objects are obtained in a magnetic pulse generator (which does not include a reactor biasing supply) by causing the charging capacitor to be shunted, during a first portion of the operating cycle of the generator, by a lower valued impedance than those used heretofore. This shunting action produces the following three effects.

In the first place, this shunting action produces the same effect as if the reactor had been biased or polarized to lower its own impedance. This is produced by by-passing energy around the reactor during the first portion of the operating cycle of the generator so that the reactor cannot saturate during this time.

Secondly, the extent to which the reactor is reset is determined by both the driving energy and the energy left in the circuit at the end of a timing interval. Because the resetting of the reactor is dependent on these two parameters, it varies along with them. Thus, shifts in the reference voltage levels at various points within the circuit produced by variations in these parameters tend to compensate for one another.

Thirdly, when a shunting impedance is applied across the capacitor, a slightly greater current is caused to flow in the charging inductor which causes more energy to be stored in the inductor. The additional energy stored in the inductor increases the rate at which potential is applied to the saturable reactor during a second portion of the operating cycle of the generator. As explained hereinbefore with respect to the use of high Q components, when the slope of the potential applied to the reactor is increased, variations in the timing intervals are reduced.

Variations in the timing intervals have been found to be reduced to such an extent through the use of the present invention that any additional reduction provided by using high Q components has been unmeasurable. The present invention, therefore, not only further reduces these variations but it also eliminates the necessity of using high Q components.

Another source of time interval variations has been experienced when pulse-forming networks have been connected to the output terminals of prior art magnetic pulse generators. In particular, it has been found difficult to correctly reset the pulse-forming networks at the termination of each pulse. Through the use of several embodiments of the present invention, this is eliminated. In these embodiments, improved resetting is effected by causing a resetting current to pass through the network which is related to the reference potential levels established in the pulse generator. The network is therefore reset in a compensating manner similar to the generator.

Other objects and features of the invention will be apparent from a study of the following detailed descriptions of several specific embodiments. In the drawings:

Fig. 1 shows a schematic diagram of one embodiment illustrating the principles underlying the invention;

Figs. 2A and 2B illustrate waves appearing at several points within the embodiment of Fig. 1;

Figs. 3 and 4 show schematic diagrams of two more embodiments of the invention; and Fig. 5 shows a schematic diagram of one embodiment of the invention used for modulating a magnetron.

In Fig. 1 a serially connected combination comprising an inductor 10 and a capacitor 11 is connected across a source 12. Source 12 generates sinusoidal voltages, although other waveforms may be used as taught in the above-cited references. Another serially connected combination comprising a diode 13 and a resistor 14 is connected across capacitor 11. The polarity of diode 13 is determined by the desired polarity of the output pulses generated by the circuit as will become apparent in the following discussion. As shown in Fig. 1, diode 13 is poled so that it is forward biased when the capacitor 11 terminal connected to inductor 10 is positive with respect to the other capacitor 11 terminal. One terminal of a saturable reactor 15 is connected to the junction between inductor 10 and capacitor 11 while its other terminal is connected to an output terminal 16. Reactor 15 is a non-linear inductor whose core is adapted to saturate very abruptly which causes the self-inductance of its winding to equally abruptly drop to an extremely low value approaching that of the "air core" value. Reactor 15 may, therefore, be thought of as a magnetic switch. The construction and theory of operation of such devices, which are sometimes referred to as "pulseactors" or "thyractors," are fully presented in the above-referred to "Proceedings of the Institution of Electrical Engineers." The junction between capacitor 11, source 12 and resistor 14 is connected to another output terminal 17. A load 18 is connected between terminals 16 and 17.

In order to facilitate the explanation of the operation of the embodiment of Fig. 1, several waveforms are presented in Figs. 2A and 2B. Both of these waveforms are measured with respect to terminal 17 which is indicated as being at ground potential. Fig. 2A illustrates the waveform of one cycle of the driving voltage supplied by source 12 while Fig. 2B illustrates the general waveform of the potential appearing across capacitor 11 during one cycle of the driving voltage. As shown between times $t_1$ and $t_2$ in Fig. 2B, the ungrounded terminal of capacitor 11 is positive with respect to ground which, in turn, forward biases diode 13. In accordance with one feature of the invention, resistor 14 and diode 13, when forward biased, shunt capacitor 11 so that reactor 15 does not saturate at this time. In accordance with another feature of the invention, reactor 15 is left at time $t_2$ in a reset magnetic condition which is related to the potential appearing across capacitor 11 between the time $t_1$ and $t_2$. Furthermore, in accordance with still another feature of the invention, this shunting action causes inductor 10 to store more energy during the first part of this interval for use during the remaining part of the cycle between the times $t_2$ and $t_3$. All of these features are considered in greater detail in the following discussion.

It will be noted that the shape of the waveform of Fig. 2B between the times $t_1$ and $t_2$ is similar to the typical transient occurring across the capacitor of a serially connected capacitor-inductor combination when a sinusoidal wave is applied across the combination. In accordance with the present invention, however, the maximum amplitude of the potential across the capacitor during this interval is reduced because of the shunting action of diode 13 and resistor 14. This, in turn, limits the energy applied to reactor 15 so that it cannot saturate during this time. In other words, diode 13 and resistor 14 by-pass current around reactor 15 so that it cannot saturate during the positive portion of the potential appearing across capacitor 11.

The resetting of reactor 15 between output pulses is accomplished between the times $t_1$ and $t_2$. Furthermore, the point on its hysteresis curve to which it is reset is determined by the charge on capacitor 11 during this interval, which is directly related to the potential appearing across the capacitor. As the charge on capacitor 11 is a function of the driving energy and the energy unabsorbed by load 18, the resetting of reactor 15 varies with variations of these parameters. The point to which reactor 15 is reset determines the energy needed between the times $t_2$ and $t_3$ to cause it to saturate. The energy available between the times $t_2$ and $t_3$, which is stored in capacitor 11, also varies with variations of the input and unabsorbed output energies. These variations of the energy stored in capacitor 11 between the times $t_1$ and $t_2$ and the times $t_2$ and $t_3$ tend to compensate for one another, thereby causing reactor 15 to be saturated consistently at the time $t_3$.

As discussed previously, resistor 14 and diode 13, when it is forward biased, provide a shunting path around capacitor 11 which prohibits the potential across this capacitor from reaching the amplitude that it would reach in the absence of the shunting path. Because of this effect, a slightly greater current passes through inductor 10 so that a greater amount of energy is stored in the inductor. When the potential cross capacitor 11 begins to decrease (point A of Fig. 2B), the energy stored within inductor 10 is utilized in changing the potential across capacitor 11. Because of the additional energy stored in inductor 10 the rate at which the potential across capacitor 11 is changed is increased over that heretofore possible. In other words, the slope of the waveform between points A—C is increased over that produced by arrangements found in the prior art. Diode 13 remains forward biased until the ungrounded terminal of capacitor 11 is substantially at ground potential (i.e., point B in Fig. 2B). Because of this continuing shunting action between the points A and B, the discharging of capacitor 11 is further accelerated. At point B, diode 13 becomes reverse biased, thereby removing the shunting action from capacitor 11. A negative potential now begins to build up across capacitor 11. This potential is applied to reactor 15. The slope of the potential applied to reactor 15 is greater than that heretofore obtainable because of the additional energy stored in inductor 10. This increases the rate at which energy is applied to the reactor. At point C (time $t_3$) the energy supplied to reactor 15 is sufficient to saturate it. When reactor 15 saturates a low impedance path is provided to load 18. Energy from source 12, inductor 10 and capacitor 11 is then applied to the load. The potential across capacitor 11 rapidly drops to substantially ground potential. The effect of this action is to apply a pulse of energy to load 18. Reactor 15 is removed from its saturated condition during the next positive half cycle of the driving voltage.

The embodiment of Fig. 3 is identical to that of Fig. 1 with the exception that diode 13 and resistor 14 shunt reactor 15 instead of capacitor 11. The wave forms of Figs. 2A and 2B also apply to this embodiment. When the potential across capacitor 11 is positive with respect to ground, diode 13 is forward biased so that resistor 14 and load 18 shunt capacitor 11. As in the embodiment of Fig. 1, when capacitor 11 is shunted, reactor 15 does not receive sufficient energy to cause it to saturate. Furthermore, the shunting action provided by this arrangement causes inductor 10 to store additional energy in a manner identical to that of the embodiment of Fig. 1. The embodiment of Fig. 3 permits a current greater than that found in the prior art to pass through the load during the positive portion of the waveform of the potential across capacitor 11. It has been found that in some applications of the present invention this current is useful for resetting and other purposes. One such use, which is discussed subsequently, is shown in Fig. 5.

Fig. 4 shows still another embodiment of the invention. This embodiment is identical to those disclosed in Figs. 1 and 3 with the exception that the serially connected combination of diode 13 and resistor 14 is connected across an auxilary winding on reactor 15. This auxiliary winding reflects the effect of diode 13 and resistor 14 across the main winding of reactor 15 so that the effect produced by them is identical to that produced by diode 13 and resistor 14 of Fig. 3.

In Fig. 5 the embodiment shown in Fig. 3 applies its output energy to a pulse-forming network 19 which, in turn, applies the energy to a magnetron 20. Pulse-forming network 19 and magnetron 20 are similar to those disclosed and fully discussed in the above referred to Neitzert application.

Pulse-forming network 19 includes two saturable reactors 21 and 22 which are saturated during each cycle of operation of the pulse genertor. When these reactors are not correctly reset during each cycle, variations occur between the time an input is applied to the network and an output is produced by the network. Such variations also produce variation in the time intervals between the driving voltages and the pulses applied to magnetron 20. As mentioned with respect to the embodiment of Fig. 3, a current flows through its load 18 when diode 13 is forward biased. In Fig. 5 this current passes through reactor 21 and also causes a current to pass through reactor 22. These currents reset the reactors during each cycle of the generator. Because the amplitudes of these currents are related to the energy stored in capacitor 11, this resetting feature is self-compensating, thus substantially eliminating timing interval variations previously produced by the pulse-forming network. Similar compensation is produced when the embodiment of Fig. 4 discharges into a similar load.

Although the invention has been described using sources providing sinusoidal driving voltages, other sources may be employed. The Neitzert application, for example, discloses another source that may be used. Furthermore, although the described embodiments have utilized a serially connected combination comprising a diode and a resistor to produce a shunting path around the capacitor in the charging circuit, it is to be understood that any means which provides a shunting path having similar characteristics may be utilized without departing from the spirit and scope of the invention.

What is claimed is:

1. A pulse generator for supplying pulses to a load, said generator comprising a source of driving voltage which produces positive and negative voltages in a cyclic manner, a charging circuit including an inductive means and a capacitive means, means connecting said charging circuit across said source, switching means which closes in response to a predetermined amount of energy applied thereto, means connecting said switching means and said load in series across said capacitive means, and means for causing said capacitive means to be shunted by a predetermined value of impedance less than the sum of the impedance of said load and the open circuit impedance of said switching means during a portion of each cycle of said driving voltage.

2. Apparatus in accordance with claim 1 wherein said switching means comprises a saturable reactor.

3. A pulse generator for supplying pulses to an output load, said generator comprising a source of driving voltage which produces positive and negative voltages in a cyclic manner, inductive means, capacitive means, means connecting said inductive means and said capacitive means in series across said source, saturable reactive means, means connecting said saturable reactive means and said load in series across said capacitive means, and means for causing said capacitive means to be shunted by a predetermined value of impedance less than the sum of the impedance of said load and the unsaturated impedance of said saturable reactive means during a first portion of each cycle of said driving voltage.

4. Apparatus in accordance with claim 3 wherein said source produces a sinusoidal driving voltage.

5. A pulse generator for supplying pulses to an output load, said generator comprising a source of driving voltage which produces positive and negative voltages in a cyclic manner, an inductor, a capacitor, means connecting said inductor and said capacitor in series across said source, saturable reactive means, means connecting said saturable reactive means and said load in series across said capacitor, means for producing a relatively high impedance to currents in one direction and a lower impedance to currents in the opposite direction, and means connecting the last mentioned means across said capacitor.

6. Apparatus in accordance with claim 5 wherein said means for producing a relatively high impedance to currents in one direction and a lower impedance to currents in the opposite direction comprises a diode, a resistor, and means for serially connecting said diode and said resistor.

7. Apparatus in accordance with claim 6 wherein said source produces a sinusoidal driving voltage.

8. A pulse generator for supplying pulses to an output load, said generator comprising a source of driving voltage which produces positive and negative voltages in a cyclic manner, an inductor, a capacitor, means connecting said inductor and said capacitor in series across said source, saturable reactive means, means connecting said saturable reactive means and said load in series across said capacitor, means for producing a relatively high impedance to currents in one direction and a lower impedance to currents in the opposite direction, and means connecting the last mentioned means across said reactor.

9. Apparatus in accordance with claim 8 wherein said means for producing a relatively high impedance to currents in one direction and a lower impedance to currents in the opposite direction comprises a diode, a resistor, and means for serially connecting said diode and said resistor.

10. Apparatus in accordance with claim 9 wherein said source produces a sinusoidal driving voltage.

11. A pulse generator for supplying pulses to an output load, said generator comprising a source of driving voltage which produces positive and negative voltages in a cyclic manner, an inductor, a capacitor, means connecting said inductor and said capacitor in series across said source, saturable reactive means having a main winding and an auxiliary winding, means connecting the main winding of said saturable reactive means and said load in series across said capacitor, means for producing a relatively high impedance to currents in one direction and a lower impedance to currents in the opposite direction, and means for connecting the last mentioned means across the auxiliary winding of said reactor.

12. Apparatus in accordance with claim 11 wherein said means for producing a relatively high impedance to currents in one direction and a lower impedance to currents in the opposite direction comprises a diode, a resistor, and means for serially connecting said diode and said resistor.

13. Apparatus in accordance with claim 12 wherein said source produces a sinusoidal driving voltage.

No references cited.